United States Patent
Seo et al.

(10) Patent No.: US 7,698,262 B2
(45) Date of Patent: Apr. 13, 2010

(54) APPARATUS AND METHOD FOR SEARCHING MULTIMEDIA DATA BASED ON METADATA

(75) Inventors: Hee-Cheol Seo, Daejon (KR); Soo-Jun Park, Seoul (KR); Myung-Gil Jang, Daejon (KR); Hyun-Ki Kim, Daejon (KR); Yi-Gyu Hwang, Daejon (KR); Soo-Jong Lim, Daejon (KR); Jeong Heo, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 392 days.

(21) Appl. No.: 11/701,955

(22) Filed: Feb. 2, 2007

(65) Prior Publication Data

US 2007/0233673 A1    Oct. 4, 2007

(30) Foreign Application Priority Data

Mar. 29, 2006  (KR) .................. 10-2006-0028665
Jan. 29, 2007   (KR) .................. 10-2007-0008812

(51) Int. Cl.
*G06F 17/30* (2006.01)
(52) U.S. Cl. .................. 707/3; 707/102; 707/104.1
(58) Field of Classification Search .................. 707/1, 707/63, 3, 102, 104.1; 704/7; 370/395.64
See application file for complete search history.

(56) References Cited

U.S. PATENT DOCUMENTS

| | | | |
|---|---|---|---|
| 6,374,260 B1 * | 4/2002 | Hoffert et al. ............ | 707/104.1 |
| 6,496,856 B1 * | 12/2002 | Kenner et al. ............... | 709/218 |
| 6,681,231 B1 * | 1/2004 | Burnett ..................... | 707/104.1 |
| 6,931,391 B2 * | 8/2005 | Tang et al. .................. | 707/2 |
| 2003/0187829 A1 * | 10/2003 | Emura et al. ................... | 707/1 |
| 2004/0073941 A1 * | 4/2004 | Ludvig et al. ............... | 725/113 |
| 2004/0267720 A1 * | 12/2004 | Liu et al. ....................... | 707/3 |
| 2007/0192300 A1 * | 8/2007 | Reuther et al. ................. | 707/3 |
| 2007/0192351 A1 * | 8/2007 | Liu et al. .................... | 707/102 |

FOREIGN PATENT DOCUMENTS

| | | |
|---|---|---|
| KR | 1020010092899 | 10/2001 |
| KR | 1020030029410 | 4/2003 |
| KR | 1020030059398 | 7/2003 |
| KR | 1020050006565 | 1/2005 |

OTHER PUBLICATIONS

Lim, Jae-Hyoung, et al., "MPEG-7 Based Web Image Indexing and Searching", 2000, *The Conference on Korean Information Processing Society*.

* cited by examiner

*Primary Examiner*—Don Wong
*Assistant Examiner*—Hanh B Thai
(74) *Attorney, Agent, or Firm*—Ladas & Parry LLP

(57) ABSTRACT

Provided are an apparatus and method for searching multimedia data based on metadata. The apparatus for searching multimedia data includes: a mapping information storing unit for storing and managing mapping information between a Moving Picture Experts Group 7 (MPEG-7) query attribute and an MPEG-7 metadata property; and a query attribute mapping unit for acquiring the MPEG-7 metadata property to be mapped with the MPEG-7 query attribute according to a user query based on the mapping information.

19 Claims, 1 Drawing Sheet

APPARATUS AND METHOD FOR SEARCHING MULTIMEDIA DATA BASED ON METADATA

FIELD OF THE INVENTION

The present invention relates to an apparatus and method for searching multimedia based on metadata; and, more particularly, to apparatus and method for searching multimedia data based on Moving Picture Experts Group 7 (MPEG-7) metadata.

DESCRIPTION OF RELATED ART

Moving Picture Experts Group 7 (MPEG-7) is related to a structure of metadata for displaying multimedia data information such as image, audio, and moving picture. A system for searching MPEG-7 multimedia data searches MPEG-7 multimedia data related to a query inputted in an MPEG-7 query format.

One of formats for forming a query for searching MPEG-7 multimedia data is an MPEG-7 query format. The MPEG-7 query format defines a syntax for searching an MPEG-7 document and a technology on MPEG-7 metadata.

Since the MPEG-7 query format supports syntax for displaying all information of the multimedia data, the MPEG-7 query format is complicated. When the user searches multimedia data in the MPEG-7 query format, it is required to use the MPEG-7 metadata. However, it is difficult for the search user to understand and describe the complicated structure of the MPEG-7 metadata to form a search query.

For example, when the MPEG-7 query format is used without any change in searching of a photograph of Hong, Gil-Dong, there is a problem that a query should be formed in complicated MPEG-7 metadata of a format such as /Mpeg7/Description/Semantics/SemanticBase/Agent/Name=Hong, Gil-Dong AND //MediaInformation/MediaProfile/MediaFormat/FileFormat/Name='photograph'.

SUMMARY OF THE INVENTION

It is, therefore, an object of the present invention to provide an apparatus and method for searching multimedia data which can easily search the multimedia data without directly receiving a query formed as a Moving Picture Experts Group 7 (MPEG-7) metadata from a user based on a query attribute of an MPEG-7 query format and mapping information of the MPEG-7 metadata.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided an apparatus for searching multimedia data, including: a mapping information storing unit for storing and managing mapping information between a MPEG-7 query attribute and an MPEG-7 metadata property; and a query attribute mapping unit for acquiring the MPEG-7 metadata property to be mapped with the MPEG-7 query attribute according to a user query based on the mapping information.

In accordance with another aspect of the present invention, there is provided a method for searching multimedia data, including the steps of: a) extracting a query attribute from an MPEG-7 query; b) acquiring an MPEG-7 metadata property mapped with the query attribute based on mapping information; and c) creating an MPEG-7 metadata query from the MPEG-7 query based on the mapped MPEG-7 metadata property.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
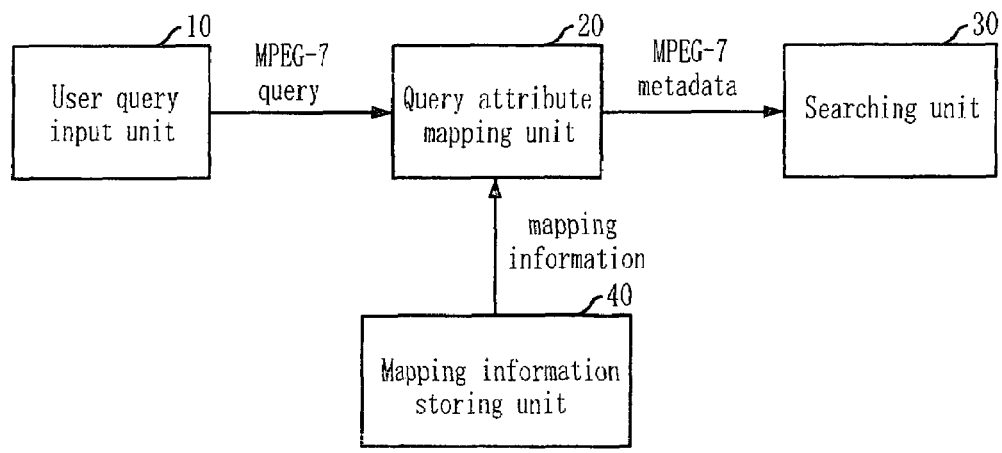
FIG. 1 is a block diagram showing an apparatus for searching multimedia data in accordance with an embodiment of the present invention.

FIG. 1 is a block diagram showing an apparatus for searching multimedia data in accordance with an embodiment of the present invention.

As shown in FIG. 1, the apparatus for searching multimedia data includes a user query input unit 10, a query attribute mapping unit 20, a searching unit 30 and a mapping information storing unit 40.

The user query input unit 10 receives a user query, which is a multimedia data search condition from a user and forms and outputs a Moving Picture Experts Group 7 (MPEG-7) query in an MPEG-7 query format.

The mapping information storing unit 40 stores and manages mapping information between an MPEG-7 query attribute and an MPEG-7 metadata property and provides the mapping information to the query attribute mapping unit 20.

The query attribute mapping unit 20 receives the MPEG-7 query from the user query input unit 10, extracts the MPEG-7 query attribute included in the MPEG-7 query, acquires an MPEG-7 metadata property mapped with an MPEG-7 query attribute extracted from mapping information provided by the mapping information storing unit 40, and forms and outputs an MPEG-7 metadata query based on MPEG-7 metadata property.

The searching unit 30 searches multimedia data based on the MPEG-7 metadata query outputted from the user query input unit 10.

An example of the mapping information stored in the mapping information storing unit 40 is as shown in Table 1 below.

TABLE 1

| MPEG-7 query attribute | MPEG-7 metadata property |
|---|---|
| person | /Mpeg7/Description/Semantics/SemanticBase/Agent/Name |
| person | /Mpeg7/DescriptionMetadata/Creator/Agent/Name |
| place | //Semantics/SemanticBase/Place/Name |
| object | //Semantics/SemanticBase/Object |
| event | //Semantics/SemanticBase[type=EventType] |
| type | //MediaInformation/MediaProfile/MediaFormat/FileFormat/Name |
| fileSize | //MediaInformation/MediaProfile/MediaFormat/FileSize |
| . . . | . . . |

In Table 1, the mapping information shows mapping relationship between the MPEG-7 query attribute and the MPEG-7 metadata property. The mapping information includes a couple of "MPEG-7 query attribute" and "MPEG-7 metadata property".

Meanwhile, the mapping information is described in an XML format below and provided from the mapping information storing unit 40 to the query attribute mapping unit 20.

```
<MappingInformation>
   <MappingPairs>
      <QueryProperty>person</QueryProperty>
<MPEG7Property>/Mpeg7/Description/Semantics/SemanticBase/Agent/Name
</MPEG7Property>
</MappingPairs>
   <MappingPairs>
      <QueryProperty>person</QueryProperty>
      <MPEG7Property>/Mpeg7/DescriptionMetadata/Creator/Agent/Name
</MPEG7Property>
</MappingPairs>
   <MappingPairs>
      <QueryProperty>place</QueryProperty>
<MPEG7Property>//Semantics/SemanticBase/Place/Name</MPEG7Property
>
</MappingPairs>
   <MappingPairs>
      <QueryProperty>object</QueryProperty>
<MPEG7Property>//Semantics/SemanticBase/Object</MPEG7Property>
</MappingPairs>
   <MappingPairs>
      <QueryProperty>event</QueryProperty>
<MPEG7Property>//Semantics/SemanticBase[type=EventType]</MPEG7Property
>
</MappingPairs>
   <MappingPairs>
      <QueryProperty>type</QueryProperty>
<MPEG7Property>//MediaInformation/MediaProfile/MediaFormat/FileFormat/Name
</MPEG7Property>
</MappingPairs>
   <MappingPairs>
      <QueryProperty>fileSize</QueryProperty>
<MPEG7Property>//MediaInformation/MediaProfile/MediaFormat/FileSize
</MPEG7Property>
</MappingPairs>
...
</MappingInformation>
```

The XML document forms a couple of an MPEG-7 query attribute, which is QueryProperty, and an MPEG-7 metadata property, which is MPEG7Property. The MPEG-7 metadata property is described in an XPath format. One query attribute can be mapped with at least one MPEG-7 metadata property. In the XML document, an MPEG-7 query attribute "person" is mapped with two MPEG-7 metadata properties.

Figure 2:
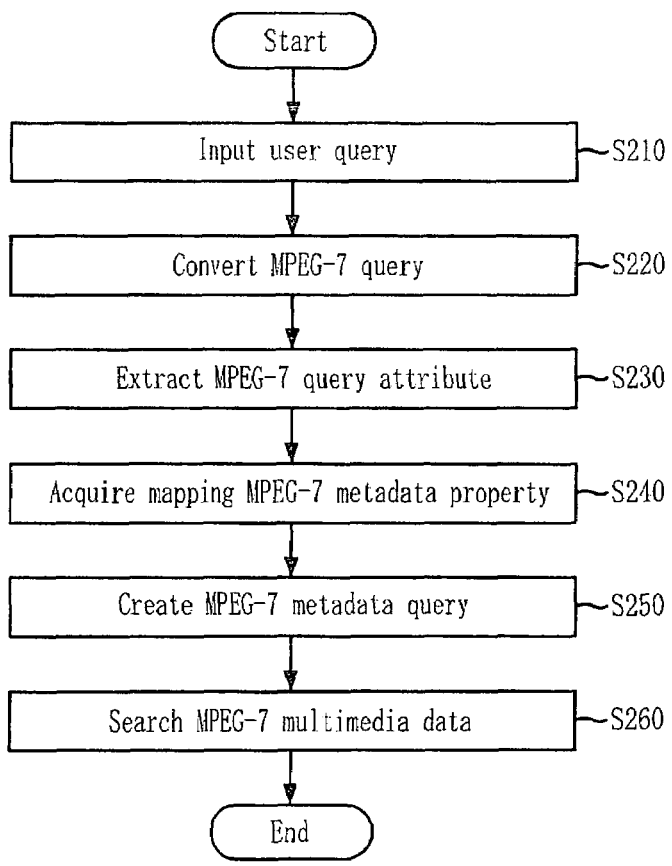
FIG. 2 is a flowchart describing a procedure for searching Moving Picture Experts Group 7 (MPEG-7) multimedia data in accordance with an embodiment of the present invention.

FIG. 2 is a flowchart describing a procedure for searching MPEG-7 multimedia data in accordance with an embodiment of the present invention.

The user query input unit 10 receives a user query at step S210. As an example of the user query, it is assumed that a user query for searching a photograph related to a person called "Hong, Gil-Dong" is received.

The query attribute mapping unit 20 converts the user query into an MPEG-7 query at step S220. The user query for searching the photograph related to the person called "Hong, Gil-Dong" is converted into an MPEG-7 query document below.

```
<QueryCondition>
   <QueryConditionBag operator="AND">
      <FeatureQueryCondition operator="equal to">
         <FeatureValuePair value_type="string">
            <FeatureName>person</FeatureName>
            <FeatureValue type="string">Hong,Gil-Dong</FeatureValue>
         </FeatureValuePair>
      </FeatureQueryCondition>
      <FeatureQueryCondition operator="equal to">
```

-continued

```
         <FeatureValuePair value_type="string">
            <FeatureName>type</FeatureName>
            <FeatureValue type="string">photograph</FeatureValue>
         </FeatureValuePair>
```

-continued

```
    </FeatureQueryCondition>
  </QueryConditionBag>
</QueryCondition>
```

The query attribute mapping unit 20 extracts an MPEG-7 query attribute from the MPEG-7 query at step S230. In an example of the search query, <FeatureName>person</FeatureName> and <FeatureName>type</FeatureName> are mapped with a query attribute.

The query attribute mapping unit 20 acquires an MPEG-7 metadata property mapped with the query attributes "person" and "type" from the mapping information provided by the mapping information storing unit 40 at step S240.

The query attribute mapping unit 20 creates an MPEG-7 metadata query from the MPEG-7 query based on the mapped MPEG-7 metadata property at step S250 and the searching unit 30 searches multimedia data based on the MPEG-7 multimedia data query at step S260.

When one query attribute is mapped with at least one MPEG-7 metadata, relationship between the query attribute and the MPEG-7 metadata is expressed as an OR Boolean operation. In the search query, "person" is mapped with at least one MPEG-7 metadata. An example of the MPEG-7 metadata query created through the query attribute mapping unit 20 is as follows.

```
<QueryCondition>
  <QueryConditionBag operator="AND">
    <QueryConditionBag operator="OR">
      <FeatureQueryCondition operator="equal to">
        <FeatureValuePair value_type="string">
<FeatureName>/Mpeg7/Description/Semantics/SemanticBase/Agent/Name
</FeatureName>
          <FeatureValue type="string">Hong,Gil-Dong</FeatureValue>
        </FeatureValuePair>
      </FeatureQueryCondition>
      <FeatureQueryCondition operator="equal to">
        <FeatureValuePair value_type="string">
          <FeatureName>/Mpeg7/DescriptionMetadata/Creator/Agent/Name
</FeatureName>
          <FeatureValue type="string">photograph</FeatureValue>
        </FeatureValuePair>
      </FeatureQueryCondition>
    </QueryConditionBag>
    <FeatureQueryCondition operator="equal to">
      <FeatureValuePair value_type="string">
<FeatureName>//MediaInformation/MediaProfile/MediaFormat/FileFormat/Name
      </FeatureName>
        <FeatureValue type="string">photograph</FeatureValue>
      </FeatureValuePair>
    </FeatureQueryCondition>
  </QueryConditionBag>
</QueryCondition>
```

The present invention can easily search multimedia data based on MPEG-7 metadata without directly receiving an MPEG-7 metadata query from users.

Also, the present invention can efficiently search multimedia data corresponding to a user query by searching an MPEG-7 metadata property mapped with an attribute shown in the user query.

Also, the present invention can acquire an MPEG-7 metadata property related to an attribute of an MPEG-7 query format.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean patent application Nos. 2006-0028665 and 2007-0008812, filed with the Korean Intellectual Property Office on Mar. 29, 2006 and Jan. 29, 2007, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for searching multimedia data, comprising:
   a mapping information processor for managing mapping information between a Moving Picture Experts Group 7 (MPEG-7) query attribute and an MPEG-7 metadata property;
   a mapping information memory for storing the mapping information between the MPEG-7 query attribute and the MPEG-7 metadata property;
   a query attribute mapping processor for acquiring the MPEG-7 metadata property mapped with the MPEG-7 query attribute from the mapping information memory according to a user query based on the mapping information; and
   a query attribute mapping memory for storing the acquired MPEG-7 metadata property mapped with the MPEG-7 query attribute in accordance to the user query based and the mapping information, wherein the query attribute mapping processor creates and outputs an MPEG-7 metadata query based on the mapped MPEG-7 metadata property.

2. The apparatus as recited in claim 1, further comprising:
   a query input processor for creating and outputting an MPEG-7 query in an MPEG-7 query format from the user query; and
   a query input memory for storing the MPEG-7 query and the user query.

3. The apparatus as recited in claim 1, further comprising:
   a searching unit for searching multimedia data based on the MPEG-7 metadata query.

4. The apparatus as recited in claim 1, wherein the mapping information includes a couple associated between the MPEG-7 query attribute and the MPEG-7 metadata property.

5. The apparatus as recited in claim 1, wherein the mapping information memory and the query attribute mapping memory are computer readable media.

6. The apparatus as recited in claim 5, wherein the computer readable media is selected from the group consisting of CD-ROM, RAM, ROM, floppy disk, hard disk and magneto-optical disk.

7. The apparatus as recited in claim 1 wherein the mapping information is in an XML format.

8. A computer readable media having instructions stored thereon which when executed by a processor then the processor performs a method for searching multimedia data in accordance to a user query, comprising the steps of:
   receiving the user query from a user;
   forming a Moving Picture Experts Group 7 (MPEP-7) query from the user query;

extracting a MPEP-7 query attribute from the MPEP-7 query;

acquiring an MPEG-7 metadata property mapped with the MPEG-7 query attribute based on mapping information; and creating an MPEG-7 metadata query from the MPEG-7 query based on the mapped MPEG-7 metadata property.

9. The computer readable media as recited in claim 8, furthering comprising the step of:

searching multimedia data based on the MPEG-7 metadata property.

10. The computer readable media as recited in claim 8, wherein the mapping information includes a couple of the MPEG-7 query attribute and the MPEG-7 metadata property.

11. The computer readable media as recited in claim 8 wherein the computer readable media is selected from the group consisting of CD-ROM, RAM, ROM, floppy disk, hard disk and magneto-optical disk.

12. An apparatus having a processor and a memory used for searching multimedia data, the apparatus comprising:

a user query input unit for transforming a user query into a Moving Picture Experts Group 7 (MPEG-7) query;

a mapping information storing unit for storing and managing mapping information between MPEG-7 attributes and corresponding MPEG-7 metadata properties; and the query attribute mapping unit for receiving the MPEG-7 query from the user query input unit, for extracting an MPEG-7 query attribute from the received MPEG-7 query, for acquiring a corresponding MPEG-7 metadata property, from the mapping information storing unit, mapped with the extracted MPEG-7 query attribute, and for forming a MPEG-7 metadata query based on the MPEG-7 metadata property according to the user query.

13. The apparatus as recited in claim 12, wherein the user query input unit for creating and outputting the MPEG-7 query in an MPEG-7 query format from the user query.

14. The apparatus as recited in claim 12, wherein the query attribute mapping unit for outputting the MPEG-7 metadata query based on the mapped MPEG-7 metadata property.

15. The apparatus as recited in claim 14, further comprising a searching unit for searching multimedia data based on the MPEG-7 metadata query.

16. The apparatus as recited in claim 12, wherein the mapping information includes a couple of the MPEG-7 query attribute and the MPEG-7 metadata property.

17. The apparatus as recited in claim 12, wherein the memory comprises a computer readable media.

18. The apparatus as recited in claim 17, wherein the computer readable media is selected from the group consisting of CD-ROM, RAM, ROM, floppy disk, hard disk and magneto-optical disk.

19. The apparatus as recited in claim 12 wherein the mapping information is in an XML format.

\* \* \* \* \*